(12) United States Patent
Lehning

(10) Patent No.: US 12,529,784 B2
(45) Date of Patent: Jan. 20, 2026

(54) METHOD FOR DETECTING AT LEAST ONE ROAD USER

(71) Applicant: S.M.S. SMART MICROWAVE SENSORS GMBH, Braunschweig (DE)

(72) Inventor: Michael Lehning, Hildesheim (DE)

(73) Assignee: s.m.s. Smart Microwave Sensors GmbH, Braunschweig (DE)

( * ) Notice: Subject to any disclaimer, the term of this patent is extended or adjusted under 35 U.S.C. 154(b) by 257 days.

(21) Appl. No.: 17/787,024

(22) PCT Filed: Dec. 16, 2020

(86) PCT No.: PCT/EP2020/086540
§ 371 (c)(1),
(2) Date: Jun. 17, 2022

(87) PCT Pub. No.: WO2021/122828
PCT Pub. Date: Jun. 24, 2021

(65) Prior Publication Data
US 2023/0008876 A1    Jan. 12, 2023

(30) Foreign Application Priority Data

Dec. 18, 2019    (DE) ............... 10 2019 134 985.0

(51) Int. Cl.
*G01S 13/91* (2006.01)
*G01S 7/41* (2006.01)
(Continued)

(52) U.S. Cl.
CPC ............. *G01S 13/91* (2013.01); *G01S 7/412* (2013.01); *G01S 13/584* (2013.01); *G01S 13/867* (2013.01)

(58) Field of Classification Search
CPC ........ G01S 13/91; G01S 7/412; G01S 13/584; G01S 13/867
(Continued)

(56) References Cited

U.S. PATENT DOCUMENTS 9,470,790 B2    10/2016  Inomata
10,037,472 B1 *  7/2018  Chen ............... G06V 20/58
(Continued)

FOREIGN PATENT DOCUMENTS

CN    104603856 A    5/2015
CN    109313258 A    2/2019
(Continued)

OTHER PUBLICATIONS

Song et al.; "Fast Monocular Vision Based Vehicle Distance Measurement by License Plate Localization"; Nov. 1, 2018, Computer Science, 2018 Chinese Automation Congress (CAC), pp. 2774-2779.
(Continued)

*Primary Examiner* — William Kelleher
*Assistant Examiner* — Samarina Makhdoom
(74) *Attorney, Agent, or Firm* — WCF IP

(57) ABSTRACT

The invention relates to a method for detecting at least one road user on a traffic route by means of a radar sensor and an optical detector, wherein with said method
radar radiation is emitted by at least one radar transmitter of the radar sensor and reflected by the at least one road user,
the reflected radar radiation is detected by means of at least one radar receiver of the radar sensor,
the detected radar radiation is evaluated in such a way that at least one distance and one radial velocity of the at least one road user relative to the radar sensor is determined, (Continued)

Figures 3, 4:
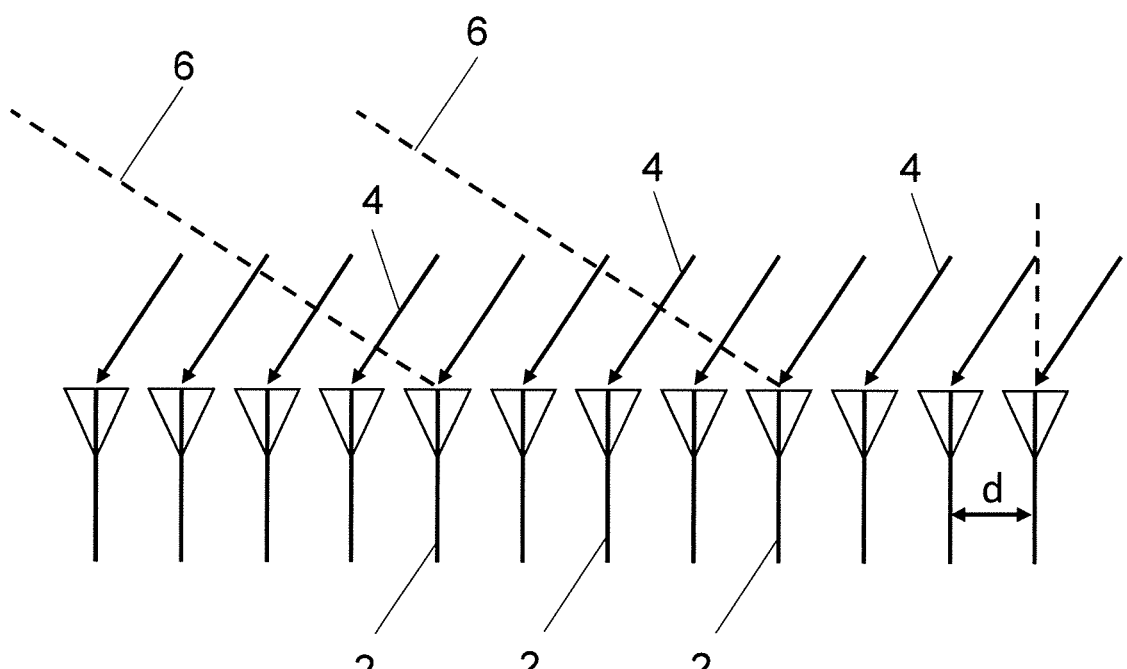

an optical image of the at least one road user is detected by means of the optical detector, and the optical image is evaluation, wherein at least one parameter of the at least one road user is determined both from the detected radar radiation and the optical image.

14 Claims, 6 Drawing Sheets

(51) Int. Cl.
  *G01S 13/58* (2006.01)
  *G01S 13/86* (2006.01)
(58) Field of Classification Search
  USPC ......................................................... 342/107
  See application file for complete search history.

(56) References Cited

U.S. PATENT DOCUMENTS

| | | |
|---|---|---|
| 11,709,257 B2 | 7/2023 | Wintermantel |
| 2003/0189512 A1* | 10/2003 | Chen ................... G01S 13/5244 342/107 |
| 2014/0306840 A1* | 10/2014 | Koerber ................ G01S 13/422 342/107 |
| 2015/0084806 A1 | 3/2015 | Rohling |
| 2015/0219758 A1* | 8/2015 | Gammenthaler ..... G01S 13/867 342/107 |
| 2016/0097849 A1* | 4/2016 | Nichols ................ G08G 1/0175 342/107 |
| 2017/0293028 A1* | 10/2017 | Trummer ............... G01S 13/345 |
| 2020/0175315 A1* | 6/2020 | Gowaikar .............. G05D 1/249 |
| 2020/0191935 A1 | 6/2020 | Mende |
| 2021/0158544 A1 | 5/2021 | Steinmeyer et al. |

FOREIGN PATENT DOCUMENTS

| | | | |
|---|---|---|---|
| DE | 102010012811 A1 * | 9/2011 | ................ G01P 3/38 |
| DE | 102012008350 A1 | 10/2013 | |
| DE | 102017105783 A1 * | 9/2018 | .......... G01S 13/343 |
| DE | 102017207607 A1 | 11/2018 | |
| DE | 102018205879 A1 | 10/2019 | |
| EP | 3252501 A1 * | 12/2017 | ............ B60R 11/04 |
| EP | 2 793 045 B1 | 12/2019 | |
| JP | 2001-216596 A | 8/2001 | |
| JP | 2008002817 A | 1/2008 | |
| JP | 2008-215912 A | 9/2008 | |
| JP | 2015041265 A | 3/2015 | |
| JP | 2015203677 A | 11/2015 | |
| JP | 5884912 B2 | 3/2016 | |
| JP | 2018081628 A | 5/2018 | |
| JP | 2019526781 A | 9/2019 | |
| WO | 2014033956 | 3/2014 | |
| WO | 2014033956 A1 | 8/2016 | |
| WO | 2018166683 A1 | 5/2018 | |

OTHER PUBLICATIONS

Texas Instruments; "Automated Parking System Reference Design Using 77-GHz mmWave Sensor"; Feb. 2019, pp. 1-12.

* cited by examiner

Fig. 1

Fig. 2

METHOD FOR DETECTING AT LEAST ONE ROAD USER

The invention relates to a method for detecting at least one road user on a traffic route. Such methods have been known in various embodiments from the prior art for many years. Devices and sensors for conducting such methods are also described in the prior art.

For various applications it is advantageous to detect road users on a traffic route and classify them where applicable. Such methods are used, for example, in the control of intersections of traffic routes, in the statistical recording of road traffic, for example, in the billing of toll systems in which the use of a traffic route is subject to a charge, and in the prosecution of traffic offences, such as red light violations or speeding. Today, it is often no longer sufficient to know the number of certain road users. Sensors for detecting road users on a traffic route can also be used on the road user themselves, for example in a motor vehicle, to detect and classify other road users using the same traffic route and to assess and possibly predict their behavior. For this purpose, it is necessary, or at least of considerable advantage, to know, recognize and classify other road users in as much detail as possible.

Different sensors have been used for many years to detect road users. This concerns, for example, the use of optical cameras in the form of mono cameras or stereo cameras. A camera provides very good resolution with respect to the transverse direction in which a road user is located with respect to the camera. Consequently, it provides good angular resolution in the azimuth direction and elevation direction, which are also referred to as the lateral direction and vertical direction. However, it is usually not possible to infer the distance of an object from individual optical images provided by a single camera, unless the size of at least part of an object, for example a license plate of a road user, is known and can be determined from the optical image. The velocity of an object can usually not be inferred from a single optical image.

Stereo cameras, on the other hand, can provide information about the distance of an object given a known offset between the two individual cameras that form the stereo camera. However, the velocity cannot be resolved even in this sensor arrangement. In addition, cameras usually detect visible light and therefore do not work at all or only to a very limited extent in darkness, fog or rain and snow. However, this is necessary for equipping vehicles for autonomous driving, for example, as such vehicles should also drive autonomously at night.

Laser scanners can also be used for traffic monitoring. However, they have low spatial resolution that does not come close to the resolution of camera systems, even with recent developments such as the use of solid state lasers and/or frequency modulation. The use of wavelengths in the order of magnitude of visible light, for example in the near infrared, results in the same reflection problems as with camera systems, for example on shiny and optically reflective surfaces. In addition, there is a limited range and power due to the safety regulations applicable to lasers. Other disadvantages include the low spatial resolution, sensitivity to contamination and, in the case of frequency-modulated laser scanners, the high technical and financial expense.

Radar sensors are often used in the prior art to detect road users. Radar radiation is emitted by a radar transmitter of the radar sensor, reflected by the respective road user and then detected by a radar receiver of the radar sensor. If the radar radiation is emitted in the form of frequency ramps, for example, the detected radar radiation can be used to determine the distance of the road user from the radar sensor as well as the radial velocity, i.e. the velocity component of the road user directed towards or away from the sensor. Such a method is known from DE 10 2017 105 783, in which different frequency ramps are transmitted and so-called range-Doppler matrices are calculated from the detected received signals corresponding to the detected radar radiation. Several different frequency ramps are necessary to resolve ambiguities stemming from the Doppler frequency in determining radial velocity, or at least to mitigate their effect. A similar method is known, for example, from DE 10 201 2 008 350. However, other methods for generating a range-Doppler matrix are also possible, for example using PMCW (phase modulated continuous wave) modulation, in particular digital modulation and suitable evaluation.

Radar sensors have the disadvantage that they only offer poor angular resolution. This disadvantage is counteracted with different approaches. The angular resolution of a radar sensor can be significantly improved if multiple radar receivers arranged at fixed and known distances from each other and/or multiple radar transmitters arranged at fixed and known distances from each other are used and form the radar sensor. Even then, however, the resolution is not comparable with that of an optical sensor, such as a camera.

The invention therefore aims to specify a method with which the disadvantages of the prior art can be eliminated and the road user can be better detected.

The invention solves the problem addressed by way of a method for detecting at least one road user on a traffic route by means of a radar sensor and an optical detector in which
  radar radiation is emitted by at least one radar transmitter of the radar sensor and reflected by the at least one road user,
  the reflected radar radiation is detected by means of at least one radar receiver of the radar sensor,
  the detected radar radiation is evaluated in such a way that at least a distance and a radial velocity of the at least one road user relative to the radar sensor is determined,
  an optical image of the at least one road user is detected by means of the optical detector, and
  the optical image is evaluation,
wherein at least one parameter of the at least one road user is determined both from the detected radar radiation and the optical image.

The method combines the advantages of a radar sensor with the advantages of an optical detector, for example a mono camera or a stereo camera. The radar radiation is emitted by the at least one radar transmitter, reflected by the road user and detected as reflected radar radiation by the radar receiver. This corresponds to the operating principle of a radar sensor from the prior art. The optical detector used in the method detects an optical image. It may detect visible light, infrared radiation or UV radiation. The detected radiation may exhibit various wavelengths or be monochromatic. The optimal selection depends on the requirements of the application. This optical image detected by the optical detector is evaluated, wherein all evaluation methods known from the prior art can be used. Of course, other additional evaluations can also be conducted. According to the invention, at least one parameter of the at least one road user is determined by both measurement principles—i.e. twice, once during the evaluation of the detected radar radiation and once during the evaluation of the optical image. This double determination ensures that the parameters detected during evaluation of the detected radar radiation and the parameters determined during evaluation of the optical images can be attributed to a single road user, provided they belong to this road user.

A wide variety of variables can be used as parameters of the road user. This relates to the distance from the radar sensor and/or the optical detector, the direction in which the road user is located with respect to the radar sensor and/or the optical detector, the radial velocity with respect to the radar sensor and/or the optical detector, other velocity components in other directions, the magnitude, the orientation, the temperature and all other quantities that can be detected from detected radar radiation and/or evaluated from the optical image. The at least one parameter that is determined from both the detected radar radiation and the optical image preferably contains a direction in which the road user is located. Even though the resolution of the two measurement methods used is significantly different with respect to this parameter, certain parameters, such as this spatial direction, which were determined with the two different sensors and methods, can still be assigned to a single road user. This parameter, which is determined from both the optical image and the detected radar radiation, can also be referred to as the bridge parameter, since it makes it possible to combine the parameters of the different detection methods and assign them to the correct road user. In this way, it becomes possible to combine the parameters that can be determined by only one of the two sensor arrangements, to assign them to the same road user, and thus to supplement and expand knowledge about the road user. Parameters that can be determined by both sensor arrangements, i.e. the radar sensor and the optical detector, can be checked and compared, tested for plausibility and thus specified with lower error tolerances.

Preferably, at least one detection matrix, particularly at least one range-Doppler matrix, is determined from the detected radar radiation, from which the distance of the at least one road user from the radar sensor and/or the radial velocity of the road user with respect to the radar sensor is determined. The use of range-Doppler matrices is known from the prior art. The radar radiation is preferably emitted in the form of frequency ramps or otherwise encoded. The reflected radar radiation detected by the radar receiver of the radar sensor is subsequently mixed with the emitted signal and fed into the evaluation. Different Fast Fourier Transforms (FFT), correlations or other methods are performed, so that in the end a matrix can be obtained in which spectral weight, i.e. detected energy, is contained at certain values for the distance and the Doppler frequency and thus the radial velocity.

The radar sensor preferably has multiple radar transmitters and/or multiple radar receivers, so that multiple combinations of transmitter and receiver can be formed. An individual range-Doppler matrix can be formed for each of these combinations. These can be combined in the form of a digital beam forming process ("Digital Beam Forming") in such a way that different directions, preferably both in the azimuth direction and the elevation direction, are detected. By cleverly combining the different range-Doppler matrices, the angular resolution can be improved in this way. This produces the same effect as a swivelling sensor arrangement and/or swivelling radar sensors.

Preferably, multiple detection matrices, in particular multiple range-Doppler matrices, are determined which contain information about road users in different directions, in particular azimuth angle ranges. Information about the direction in which the at least one road user is located relative to the radar sensor is thus determined from the detected radar radiation.

Preferably, the optical image is used to determine a spatial direction in which the at least one road user is located relative to the optical detector. This has long been known from the prior art and can be achieved, for example, by multiplying individual distortion-corrected pixels of the optical detector, such as a CMOS camera, by the inverse camera matrix. In this way, each pixel can be assigned an exact spatial direction and angular range from which the electromagnetic radiation detected by the pixel originated. If the spatial direction is determined from both the optical image and the detected radar radiation, it is suitable as a bridge parameter for combining the measured values and parameters determined with the different sensor types and methods and assigning them to a road user.

Advantageously, the detected radar radiation and/or the optical image of the at least one road user is detected at various points in time and evaluated. In particular, an optical flow can be determined when evaluating optical images that have been recorded and detected several times in succession at different times. This means that certain objects or parts of objects, for example the road user or their license plate, can be identified on the various optical images and thus tracked. From this, for example, a velocity, a direction of movement, a distance and/or a size of the object, in particular of the at least one road user, can be determined. It is advantageous if other parameters are used in the evaluation of the optical images and the optical flow, preferably determined from the evaluation of the detected radar radiation.

Preferably, at least one parameter is taken into account when evaluating the detected radar radiation that was determined during a previous evaluation of the optical image. Alternatively or additionally, at least one parameter is taken into account when evaluating the detected radar radiation that was determined during a previous evaluation of the detected radar radiation. Of course, parameters can also be used that have been detected during the evaluation of the same variable. In this way, for example, road users who are not visible to the respective sensor for the entire measurement time can be detected and tracked. For example, if a passenger car approaches an intersection, it is initially visible for the sensor arrangement, for example, until it has to stop or is concealed behind a larger vehicle, such as a truck. Since the passenger car has been detected and tracked in previous evaluations, these parameters can be used to actively search for the passenger car in subsequent evaluations as well, using the known values for distance, position and/or orientation of the passenger car, for example. The same applies, for example, for passenger cars that are still visible for the sensor, but have to stop for traffic light system. The velocity of the vehicle is reduced to 0 m/s so that, in particular when evaluating the detected radar radiation, it is no longer possible to determine a velocity that differs from that of other stationary objects, such as traffic signs. Nevertheless, the parameters of previous evaluations can be used, so that the respective road user can be recognized as soon as they start again and show a radial velocity again.

A velocity of the at least one road user and/or a direction in which the at least one road user is located relative to the optical detector is determined, preferably at least also from the optical flow, preferably in combination with the radial velocity, which is particularly preferably determined from the detected radar radiation. In this way, not only the radial velocity, but also another directional velocity component of the velocity vector, preferably the entire velocity vector, can be determined. This is of considerable advantage, for example, for the application in which the sensor arrangement is positioned on a motor vehicle. For example, the sensor arrangement may monitor the section of the traffic route ahead of the motor vehicle where it is positioned. In this case, the described method is carried out to accurately detect the relative motion of other vehicles. In the same way, this method can be used to detect the individual velocity relative to stationary components and objects. For autonomous driving, it is important to detect whether or not the vehicle equipped with the sensor arrangement is on a collision course with a vehicle ahead that is travelling at a slower speed. To this end, it is not sufficient to determine the radial velocity; rather, a small component, where applicable, of the relative velocity between the two vehicles that does not point toward or away from one of the vehicles must also be determined. This is the only way to determine whether a lane change is necessary, for example, or whether the two vehicles can pass each other.

In a preferred embodiment, a component of the at least one road user is detected in the detected optical image, the dimension of which is known in at least one spatial direction, preferably in two spatial directions perpendicular to one another, so that a distance of the at least one road user from the optical detector and/or a size of the at least one road user can be determined, particularly preferably is determined, from the detected optical image. One such component is the license plate, for example, which is standardized in size in many countries. There may be two or three different embodiments of a license plate, but their dimensions are very different and known. Therefore, the apparent size, i.e. the dimensions in at least one direction in the detected image, and the knowledge of the true size can be used to infer the distance of the object, in this case the component of the at least one road user. This allows the distance to be determined both when evaluating the optical image and when evaluating the detected radar radiation, so that it can be used as a bridge parameter.

Preferably, a distance between the radar sensor and the optical detector and/or an orientation of the radar sensor relative to the optical detector is determined from the detected radar radiation and the optical image. This can be done in different ways. Typically, this works when an item, object or part of an item or object is detected during both the evaluation of the detected radar radiation and the evaluation of the optical image. Particularly preferably, the orientation of the item or object relative to the radar sensor and relative to the optical detector is detected. If the size, shape or orientation of the object is known, the positioning, i.e. in particular the distance and/or orientation, of the two sensors relative to each other can be inferred from the different perspectives that the radar sensor and the optical detector have of the item or object.

In a preferred embodiment, the distance and/or orientation of the two sensors to each other is known. Nevertheless, it is useful to determine the distance and/or the orientation from the detected radar radiation and the optical image in order to then compare it, for example, with the known nominal data. In this way, malfunctions of the sensor arrangement can be detected, which are caused, for example, by a displacement or a movement of the optical detector and/or the radar sensor relative to the respective other detector or sensor.

Preferably, when evaluating the optical image, an extent of the at least one road user in the azimuth direction and/or in the elevation direction is determined. When evaluating the detected radar radiation, the distance of the at least one road user from the radar sensor is preferably determined, with the position and/or size and/or orientation of the road user being determined from the extent and the distance. This is particularly advantageous when movements of the road user are to be predicted or anticipated. If the exact location and orientation of a road user are known, movements in a number of directions are ruled out. A passenger car, for example, can only move forward or backward and, if necessary, turn a corner. Lateral movement is generally ruled out due to the design of the passenger car. If the orientation of the passenger car is known, this means that certain movements can be ruled out from the outset, since the road user is not able to make these movements due to their technical characteristics.

Preferably, when evaluating the optical image, an orientation of the at least one road user is determined, from which a complete velocity and/or a complete direction of movement of the at least one road user is determined using the radial velocity and the distance of the at least one road user. A complete velocity and a complete direction of motion include not only a single component of motion, for example radial velocity or motion toward the sensor, but also all other components of the respective vectorial quantity.

Advantageously, the at least one road user is classified on the basis of parameters, at least one of which was determined during the evaluation of the detected radar radiation and at least one of which was determined during the evaluation of the optical image. Of course, the more different parameters are used, the more accurate and less error-prone the classification.

The invention also solves the problem addressed by way of a device for detecting at least one road user on a traffic route, which has at least one radar sensor with at least one radar transmitter and at least one radar receiver, at least one optical detector, and an electric control unit which is configured to carry out a method described here. Preferably, the at least one radar transmitter has multiple transmission antennas and/or the at least one radar receiver has multiple receiving antennas.

In the following, some examples of embodiments of the present invention will be explained in more detail by way of the attached figures: They show FIGS. 1 to 3—various stages in the evaluation of the radar radiation, FIG. 4—the schematic arrangement of multiple radar receivers, FIG. 5—the schematic representation of multiple detection matrices, in particular range-Doppler matrices, FIG. 6—a further step in the evaluation of the direction-depending detection matrices, FIGS. 7 and 8—different road users and their parameters and FIG. 9—the schematic representation of the determination of range-Doppler matrices for various spatial directions.

FIGS. 1 to 3 schematically depict three steps for determining a detection matrix, in particular a range-Doppler matrix. The outgoing radar radiation is preferably emitted in the form of frequency ramps, which are referred to as "ramp". In the matrix shown in FIG. 1, the respective received or detected radar radiation is stored as complex amplitude values under the terms "Sample 0", "Sample 1", etc., which designate the columns of the matrix shown. The different columns thus relate to different points in time, which are preferably equidistant, at which the detected radar radiation is read. This is done several times for a plurality of frequency ramps emitted one after the other. The respective measured values are entered in the different rows, each row representing one frequency ramp.

In fact, the detected radar radiation is mixed with the emitted radar radiation. This mixed radiation is transferred to the matrix shown in FIG. 1 and fed to the evaluation. From the frequency offset between the transmitted radar radiation and the detected radar radiation, which is essentially defined by the amount of time radar radiation takes to travel from the radar transmitter to the road user and back to the radar receiver, a conclusion can be reached about the distance of the road user from the radar sensor.

To this end, a first Fourier transformation is performed in the example of an embodiment shown, whereby the Fourier transformation is performed for each row of the matrix in FIG. 1. Consequently, the measured values within each individual frequency ramp are transferred to a Fourier transform. The result is the matrix shown schematically in FIG. 2, in which the columns are now defined by different radial distances from the radar sensor.

In order to arrive at the matrix shown in FIG. 3, a second Fourier transformation is performed, which is now not performed over the entries of a row, but over the entries of a column of the matrix. This is the so-called Doppler transformation, which is performed over a so-called "range gate", i.e. a column of the matrix shown in FIG. 2. This results in Doppler frequencies which can be converted into radial velocities, i.e. velocities leading towards or away from the radar sensor. In this way, the range-Doppler matrix shown in FIG. 3 is created.

FIG. 4 schematically shows an embodiment of a radar receiver which can be part of a radar sensor. It has a plurality of receiving antennas 2 which are equidistantly arranged at a distance d from each other. An equidistant arrangement is advantageous, but not necessarily required. The arrows 4 represent radar radiation that has been reflected by a road user in the example of an embodiment shown. The angle between the extension direction in which the receiving antennas 2 are arranged next to each other and the direction of the arrows 4 from which the reflected radar radiation strikes the receiving antennas 2 is an angle other than 90°. The dashed lines 6 schematically represent wave fronts of plane waves of the radar radiation. Due to the angle, the reflected radar radiation in the example of an embodiment shown first strikes the receiving antennas 2 arranged furthest to the right and only strikes the receiving antennas 2 arranged further to the left at later points in time.

If the radar radiation detected in this way is to be evaluated according to FIGS. 1 to 3, the detected radar radiation can be mixed with the transmitted radiation for each of the receiving antennas 2 and fed to the evaluation. In this way, a large number of range-Doppler matrices are created. In particular, a separate range-Doppler matrix can be calculated for each desired spatial direction by feeding the complex amplitude values for the respective desired spatial direction to the evaluation procedure, such values having been phase corrected. This method is known as digital beam forming (DBF). This procedure is shown systematically in FIG. 9. The number of possible M spatial directions, for each of which a range-Doppler matrix is calculated, can be significantly higher than the number of N (virtual) receiving antennas. Even if in principle M could be enlarged further and further, the computational effort and the maximum achievable spatial resolution provide arguments against it. In particular, however, a range-Doppler matrix can be calculated explicitly for certain spatial directions which turn out to be interesting based on the analysis of the camera image, and this result can be fed to the fusion.

While in FIG. 4 the schematically depicted receiving antennas 2 are arranged in a row or line, but this is of course not necessary in practice. Of course, it is also possible to arrange receiving antennas 2 in a two-dimensional arrangement, for example a rectangular grid. This arrangement thus enables the calculation of a range-Doppler matrix for arbitrary spatial directions through the application of digital beam forming. An example of range-Doppler matrices calculated in this way for various spatial directions is shown schematically in FIG. 5. Each of the shaded rectangles represents a range-Doppler matrix 8 calculated according to the methodology in FIG. 9.

Figure 5:
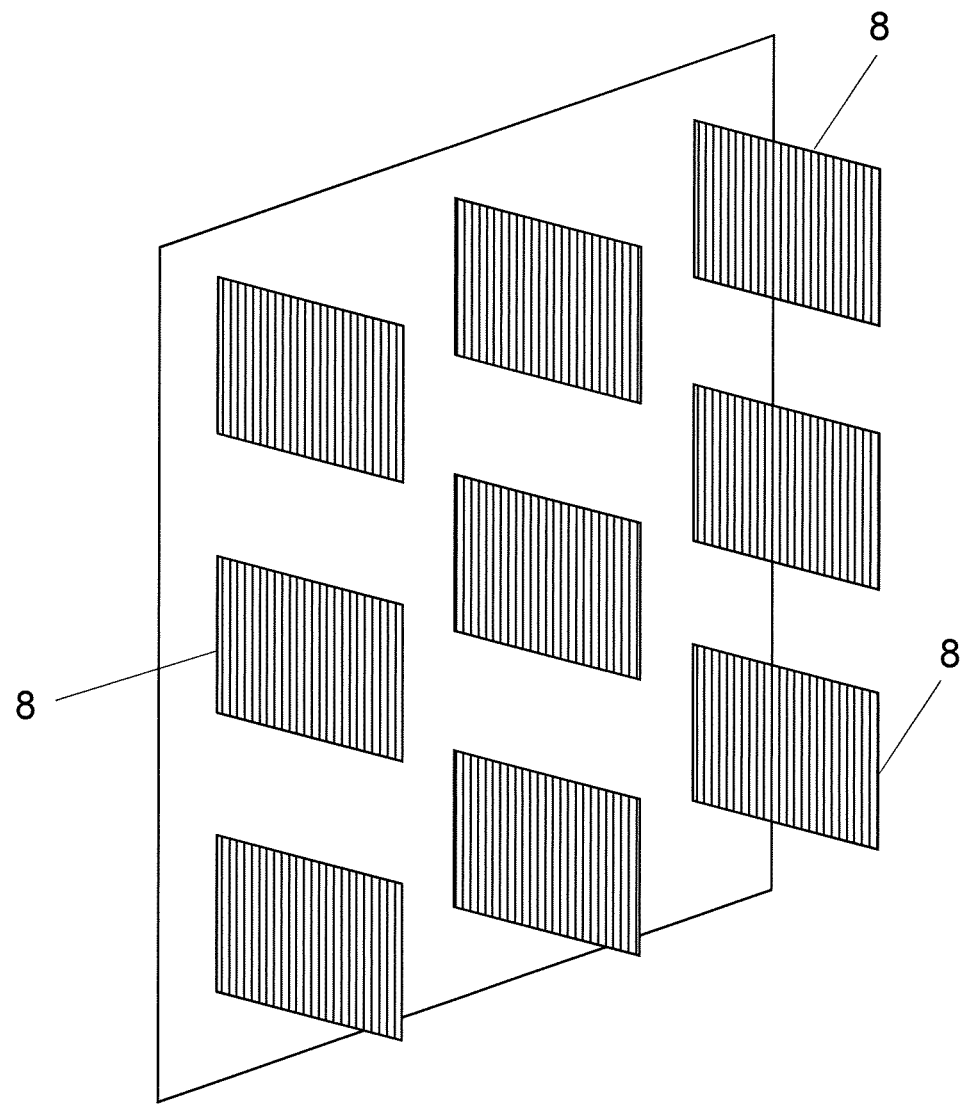
Figure 6:
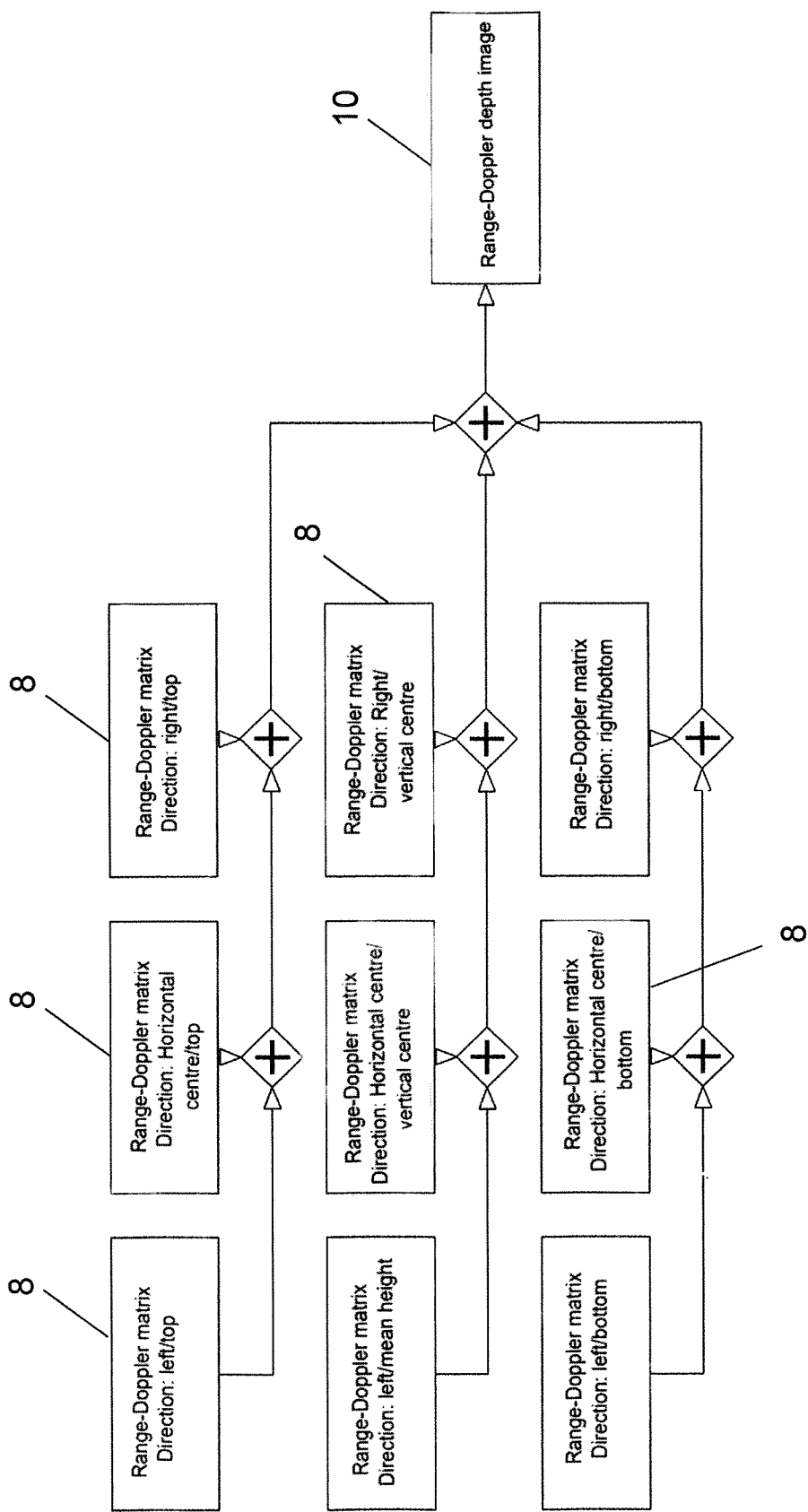

By way of known calculations of beam shaping, different range-Doppler matrices 8 can be added in a weighted way to obtain an angular resolution. FIG. 6 shows schematically that the nine range-Doppler matrices 8 shown in FIG. 5 are combined. This is of course also possible with more or fewer range-Doppler matrices 8. By combining the information obtained and calculated from the different range-Doppler matrices 8, a depth image 10 can be determined. This contains not only the radial distance of a road user from the radar sensor and their radial velocity in relation to the radar sensor, but in particular also angular information about the azimuth direction and, if necessary, the elevation direction. The direction in which an angular resolution can be achieved depends in particular on how the pattern arrangement of the receiving antennas 2 is constructed.

Figure 7:
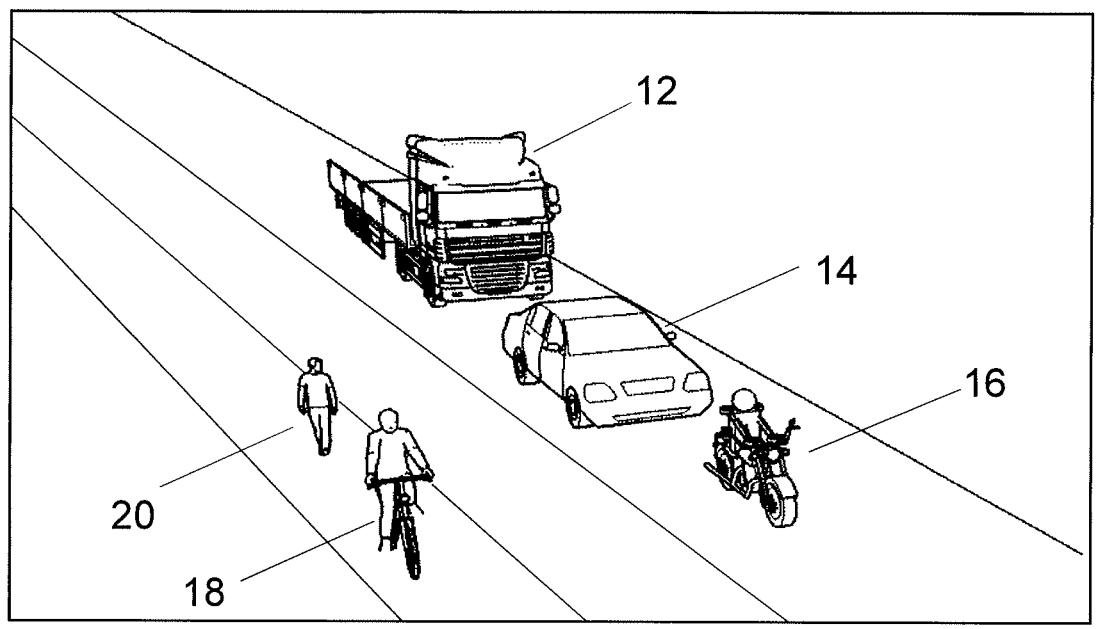

FIG. 7 shows schematically different road users which can be distinguished by a classification. A truck 12, a motor vehicle 14, a motorcycle 16, a cyclist 18 and a pedestrian 20 are depicted. These different road users can be distinguished from each other on the basis of the parameters to be determined. This applies to velocities as well as stray cross sections, dimensions and behavior on the respective traffic route.

Figure 8:
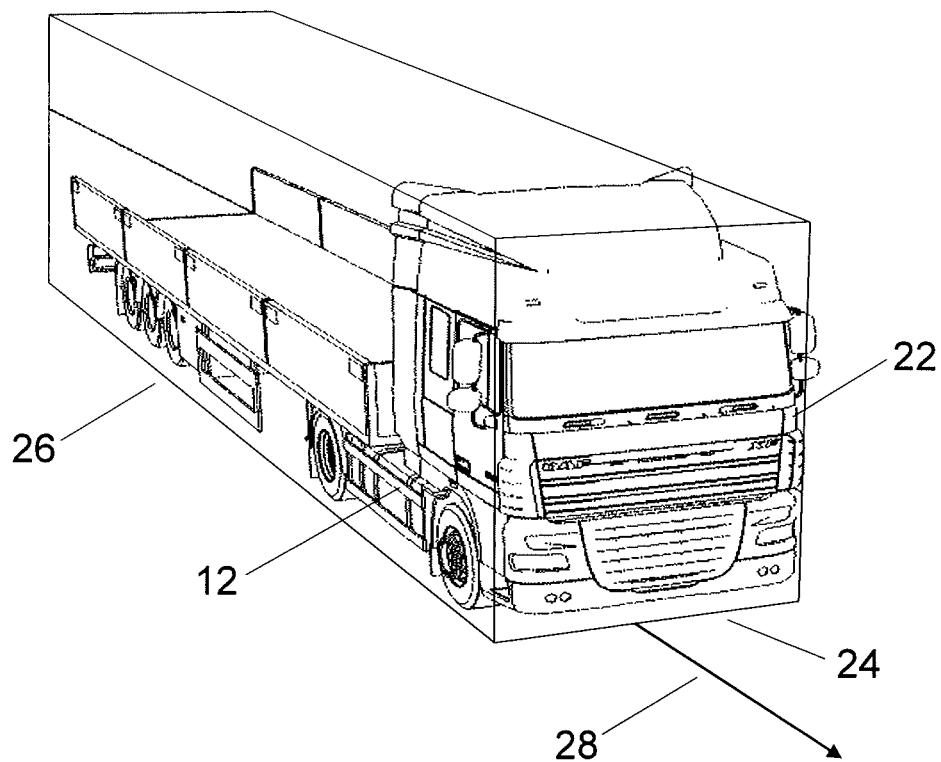

FIG. 8 shows—schematically and as an example—the truck 12 with different parameters. It has a height 22, a width 24 and a length 26, which represent some of the parameters to be determined. In addition, it moves forward along the velocity arrow 28 and has an orientation and direction, which may also be referred to as a pose.

For example, the dimensions of height 22, width 24, and length 26 can be determined from the optical image captured by means of the at least one optical detector.

This is particularly the case when elements that are also captured in the optical image are known, such as buildings, signs, dimensions of displayed elements, or other variables of the displayed objects. In this case, the dimensions of the road user contained in the optical image can be related to the known dimensions of another displayed object, so that an estimate of the dimensions is possible. However, a much better result is obtained if the dimensions contained in the optical image are related to the distance data determined from the evaluated radar radiation. The width 24 of the truck 12 can be determined via the distance of various points of the road user depicted in the optical image, for example the two exterior mirrors of a truck 12, if it is known how far away the truck 12 is from the radar sensor. This information can be determined from the range-Doppler matrix 8 or otherwise from the detected and evaluated radar beams.

A complete location of the road user, in particular of the truck 12 shown, can also be determined from the evaluated optical image alone, provided that the road geometry, i.e. in particular the course, the number of lanes, and other structural conditions of the traffic route, are known. In this case, too, the location can at least be estimated by evaluating only the optical image. However, a better result is also achieved with these parameters if this data determined from the optical image are combined with range data determined from the evaluation of the detected radar radiation. Particularly in the case of so-called radar tracking, in which a road user is tracked over a period of time and their movement is tracked by evaluating a plurality, in particular many, detection matrices generated in succession over time, it is particularly easy to determine the distance and the change in distance of the road user to the radar sensor. In combination with the significantly better angular resolution of the optical image compared to the radar sensor, the actual location of the road user can be determined very accurately.

The same applies to the pose, i.e. in particular the orientation of the road user. This can also be determined, for example, by means of image recognition software when evaluating the optical image. However, the combination with the information determined from the detected radar radiation also improves the quality of the determined parameter in this case and renders it possible to compare and check the determined values. If, for example, the orientation of a road user determined from the optical image, for example of the truck 12 shown, does not match the velocity determined from the detected radar radiation and, in particular, the direction of this velocity, this indicates an incorrect evaluation of the data.

The complete velocity, i.e. the determination of the velocity as a vectorial quantity with direction and magnitude, can also be improved by combining the data from the evaluation of the optical image with the determined parameters from the detected radar radiation. While an evaluation of several optical images taken in succession determines an optical flow and thus, for example, the change in the range of a road user in the optical image can be inferred from the change in the distance, the evaluation of radar radiation detected in succession is significantly more accurate, particularly with regard to the distance and the change in the distance to the radar sensor.

Figure 9:
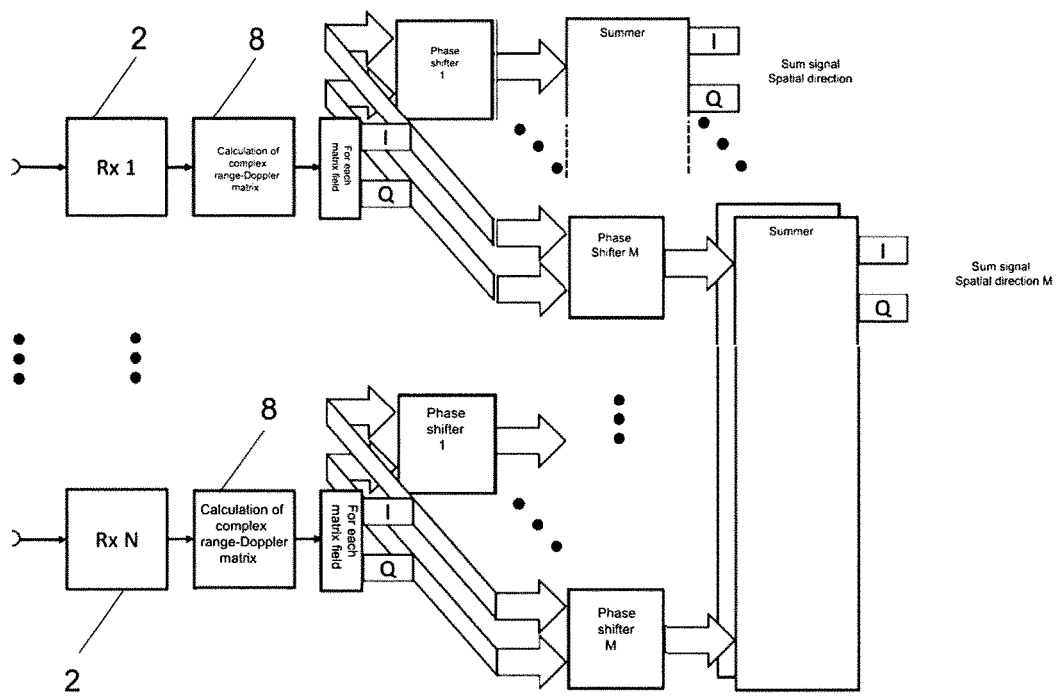

FIG. 9 schematically depicts the way to calculate range-Doppler matrices 8 for different spatial directions. Different receiving antennas 2, of which only two are shown for the sake of clarity, are used for this purpose. The received measurement signals are first used in a conventional manner to determine a range-Doppler matrix 8 in each case. This contains complex values, which in particular have an intensity I and a phase. For example, if the receiving antennas 2 are arranged next to each other, there is an offset between them. As a result, the radar radiation reflected by a road user reaches the different receiving antennas 2 at different times, as shown schematically in FIG. 4. As a result, the individual entries of the range-Doppler matrices generated separately for each receiving antenna 2 also differ in the phase Q.

If a range-Doppler matrix 8 is to be calculated for a certain spatial direction, the individual range-Doppler matrices 8 are summed up in a summer 30. A separate summer 30 is depicted for each desired spatial direction. The individual range-Doppler matrices are previously subjected to a phase shifter 32 that has been individually determined for the desired spatial direction. The phase Q of each individual matrix element of the range-Doppler matrices 8 to be summed is changed by means of these phase shifters 32 in the course of digital beam forming in order to achieve the desired spatial direction.

REFERENCE LIST 2 receiving antenna
4 arrow
6 dashed line
8 range-Doppler matrix
10 depth image
12 truck
14 motor vehicle
16 motorbike
18 cyclist
20 pedestrian
22 height
24 width
26 length
28 velocity arrow
30 summer
32 phase shifter

The invention claimed is:

1. A method for detecting at least one road user on a traffic route by a radar sensor and an optical detector, comprising:
   emitting radar radiation by at least one radar transmitter of the radar sensor, in a manner wherein said radar radiation is reflected by the at least one road user, as a reflected radar radiation;
   detecting the reflected radar radiation by at least one radar receiver of the radar sensor, as a detected radar radiation;
   evaluating the detected radar radiation in a manner including determining from the detected radar radiation:
      i) a radar radiation based radial velocity, and
      ii) a radar radiation based distance and/or a radar radiation based direction of the at least one road user relative to the radar sensor;
   detecting an optical image of the at least one road user by the optical detector, as a detected optical image; and
   evaluating the detected optical image in a manner that includes determining, from the detected optical image:
      an optical image based spatial direction and an optical image based distance of the at least one road user relative to the optical detector, and
      an optical image based orientation of the at least one road user; and
   determining at least one bridge parameter of the at least one road user, the determining comprising:
      determining, from both the radar radiation based distance and the optical image based distance, a distance of the at least one road user as the at least one bridge parameter, or
      determining, from both the radar radiation based direction and the optical image based spatial direction, a direction of the at least one road user as the at least one bridge parameter, or
      determining, from both the radar radiation based distance and the optical image based distance, a distance of the at least one road user as the at least one bridge parameter and determining, from both the radar radiation based direction and the optical image based spatial direction, a direction of the at least one road user as the at least one bridge parameter,
   wherein evaluating the detected reflected radar radiation includes a quality check that comprises comparing the optical image based orientation of the at least one road user, against:
      i) the radar radiation based radial velocity of the at least one road user relative to the radar sensor, and/or
      ii) the radar radiation based direction of the at least one road user relative to the radar sensor, and
   wherein:
      when evaluating the detected reflected radar radiation, at least one parameter is taken into account that was determined during at least one previous evaluation of a previously detected optical image, and/or when evaluating the detected optical image, at least one parameter is taken into account that was determined during at least one previous evaluation of a previously detected radar radiation.

2. The method according to claim 1, wherein evaluating the detected radar radiation comprises:

determining at least one detection matrix from the detected reflected radar radiation, and determining the radar radiation based radial velocity and the radar radiation based distance from the radar sensor based on the at least one detection matrix.

3. The method according to claim 2, wherein the at least one detection matrix comprises multiple detection matrices which contain information about road users in different directions, and information related to the radar radiation determined direction of the at least one road user from the radar sensor.

4. The method according to claim 2, further comprising:

determining with the optical image based orientation and with the radar radiation based radial velocity and the radar radiation based distance of the at least one road user: a complete velocity, and/or a direction of movement, and/or a longitudinal acceleration, and/or a transverse acceleration of the at least one road user.

5. The method according to claim 2 wherein the at least one detection matrix is a Range-Doppler-Matrix.

6. The method according to claim 1 further comprising determining, from at least two of the detected optical images obtained in the detecting the optical image of the at least one road user repeated several times in succession at different points in time, a velocity of the at least one road user.

7. The method according to claim 1 further comprising:

detecting, as a detected dimension, a dimension of a component of the at least one road user in the detected optical image, wherein a dimension of the component is known in at least one direction, and determining the optical image based distance of the at least one road user using the detected dimension from the optical detector.

8. The method according to claim 1 further comprising determining from the detected reflected radar radiation and the detected optical image a distance between the radar sensor and the optical detector and/or a relative orientation of the radar sensor in relation to the optical detector.

9. The method according to claim 8, wherein the distance between the radar sensor and the optical detector and/or the relative orientation of the radar sensor in relation to the optical detector is determined multiple times during the method.

10. The method according to claim 9 further comprising comparing, against predetermined nominal values:

the distance between the radar sensor and the optical detector, and/or the orientation of the radar sensor in relation to the optical detector.

11. The method according to claim 1 wherein:

evaluating the optical image includes determining, as an optical image determined dimension, a dimension of a component of the at least one road user in the azimuth direction and/or in the elevation direction, and determining, based on a combination of the optical image determined dimension and the radar radiation based distance, a position and/or size of the at least one road user.

12. A device for detecting at least one road user on a traffic route, comprising:

at least one radar sensor with at least one radar transmitter and at least one radar receiver, at least one optical detector, and an electric control unit which is configured to carry out a method according to claim 1.

13. The device according to claim 12, wherein at least one radar transmitter comprises multiple transmission antennas and/or the at least one radar receiver has multiple receiving antennas.

14. The method according to claim 1 further comprising determining an optical flow from different successively detected optical images of the at least one road user.

* * * * *